June 27, 1961 J. McCLURG LAMBIE 2,990,289
METHOD OF MAKING SILICEOUS REFRACTORIES
Filed Sept. 11, 1958 4 Sheets-Sheet 1

INVENTOR.
JAMES McD. LAMBIE
BY Archworth Martin
his ATTORNEY.

THERMAL EXPANSION OF SILICA MINERALS

2,990,289
METHOD OF MAKING SILICEOUS REFRACTORIES

James McClurg Lambie, Washington, Pa., assignor to Findlay Refractories Company, Washington, Pa., a corporation of Pennsylvania
Filed Sept. 11, 1958, Ser. No. 760,468
3 Claims. (Cl. 106—68)

This invention relates to the improvement of refractories especially those used against molten glass. Specifically, the purpose of the process is to make such refractories with minimum porosity (and thus more resistant to solution by molten glass) and higher in silica content. The refractory is therefore closer to the composition of glass, and upon erosion thereof by the molten glass will introduce less contamination into the melt.

This application concerns the making of a grog that will be a non-porous, glassy material, having a high silica content and a low expansion up to 800° C. The grog is used together with raw bonding clays and fines which we call the matrix, to make a body out of which is made glass melting pots, tank blocks, drawbars, and other refractory pieces.

One object of the invention is to make a dense, high-silica refractory where the silica content of the grog is as high or higher than that of the matrix, as distinguished from grogs of flint clays, which are less siliceous than the bonding clays. The word (dense) is here used in the sense of low porosity.

Another purpose is to make a high silica grog which possesses various advantages that result from near zero porosity.

Another purpose is to make a refractory that will have a low coefficient of expansion, so that it will not break when submitted to rapid heating.

Another purpose is to make a high silica grog that will have substantially no shrinkage upon subsequent firing up to the point where the excess silica in the grog crystallizes.

Another purpose is to make a refractory grog consisting of silica and kaolin and/or ball clay with a minimum of fluxes.

Another purpose is to make a high silica grog capable of being heated rapidly and whose silica will be converted to cristobalite in service firing, without rupturing the refractory in which the grog is used.

Another purpose is to make a refractory which, when it dissolves in the glass, will produce a minimum of strings, cords and stones, yet have a minimum porosity so it will be but slowly dissolved by the glass.

Another purpose is to make a minimum porosity refractory which, after firing in service, will contain a large amount of crystalline silica.

Another purpose is to make a grog that requires less water for casting, since it is near zero porosity.

The invention contemplates the use of this high silica grog to make refractory products that will be shipped unfired and be heated up when installed in the furnace. In the furnace, the excess silica will crystallize out as cristobalite and thereafter the products will not become cooled down to the alpha-beta cristobalite transformation range.

The invention also contemplates the use of this grog in making products that are fired, but which are fired to a temperature so low that the silica in the glassy grog will not crystallize out as cristobalite to an objectionable extent. The grog is defined as the fired or non-plastic portion of the body which has been ground so that the particle size is larger than 100–150 mesh. The matrix is defined as the plastic or bonding clay and/or organic bond, plus finely divided grog material that is minus 100–150 mesh. Some suitable organic bonds are goulac, indulin and latex. The matrix may have as another constituent, a refractory non-plastic material finer than 100–150 mesh which we may wish to add to the body, such as aluminum oxide, or kyanite.

Figure 1:
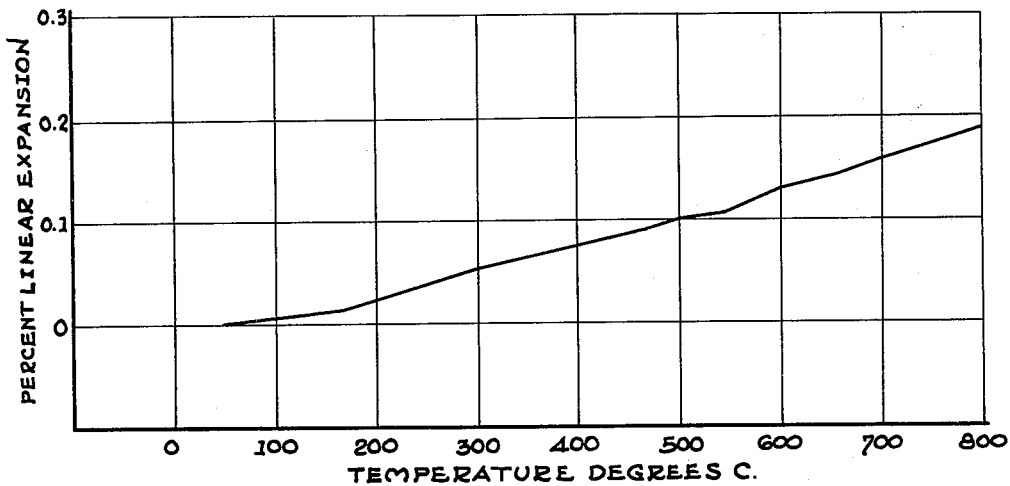
FIGURE 1 is a curve showing a grog that contains 65% $SiO_2$ to 800° C.
Figure 2:
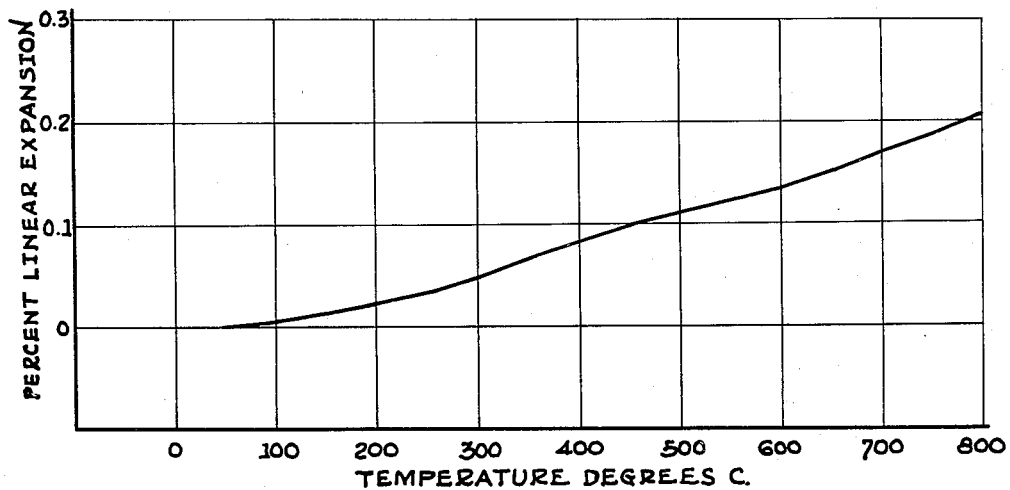
FIG. 2 shows a grog that contains 70% $SiO_2$ fires to 800° C.
Figure 3:
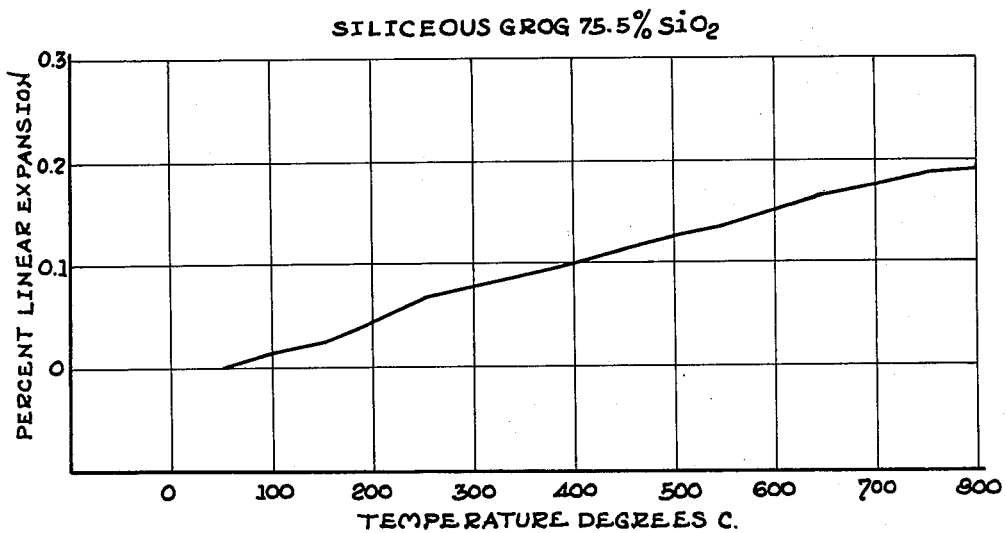
FIG. 3 is a curve that contains 75.5% $SiO_2$ and fired to 800° C.
Figure 4:
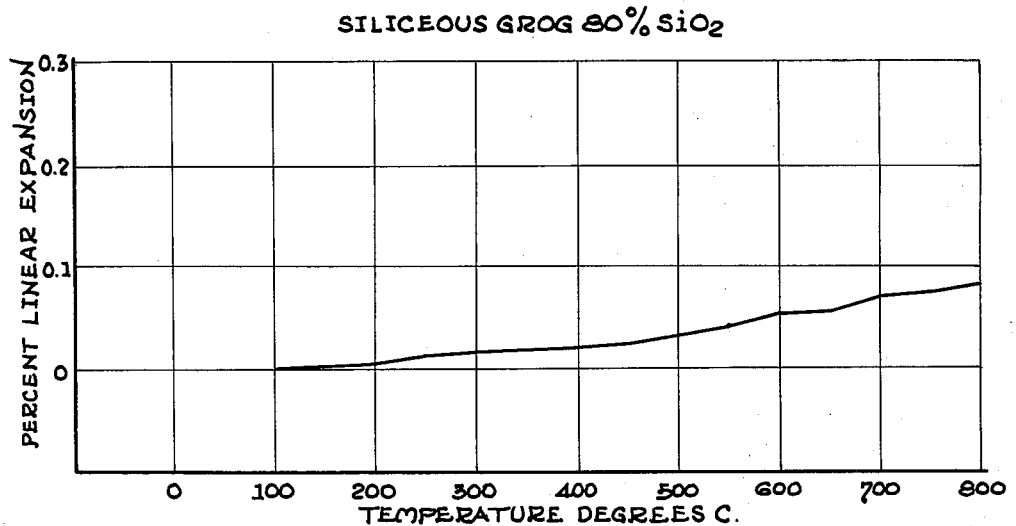
FIG. 4 is a curve that contains 80% $SiO_2$ and fired to 800° C.

Many fire clays contain a considerable amount of free silica distributed through the clay. The silica is usually quartz. Grosalmerode clay contains about 50% free silica. A well known clay, "Kaosil," contains about 50% free silica of a slightly larger particle size than Grosalmerode clay. When clays containing free silica are calcined to make grog, the clay portion shrinks while the free silica expands, resulting in a high porosity. If fired high in an attempt to reduce the porosity, the silica transforms to one of the less dense forms of silica, usually cristobalite, the amount of cristobalite formed depending upon the temperature to which the mass is fired, the time of firing, and the size of the silica particles. There is rapid expansion in firing Grosalmerode clay, owing to the quartz transformation to cristobalite.

Clay tank blocks and glass melting pots formerly were made of 50–80% calcined Grosalmerode clay as grog and bonded by Grosalmerode clay and other bonding clays. For this purpose the calcined Grosalmerode clay was fired to a temperature about cone 9 where there was little silica transformed to cristobalite. Such grog was porous and bodies made with it could not be burned to high temperatures without further shrinkage. If bodies made with this grog were fired to a high temperature the cristobalite that was formed in the grog prevented the body being cooled or reheated without cracking.

It is desirable to have a tank block or pot that shows minimum shrinkage in service. As a consequence, domestic clays lower in silica became commonly to be used instead of the German clay. Attempts have been made to synthesize German clay, using silica and pure ball clays and kaolins but whenever any composition containing an appreciable amount of free silica is fired high enough to be dense and to insure little further shrinkage, the free silica becomes cristobalite and the characteristic rapid contraction at the cristobalite inversion range causes breaking of the product in cooling and cracking when it is reheated through the cristobalite inversion range.

I achieve these objects by mixing thoroughly pure silica with a pure kaolin or kaolinitic clay, and/or ball clay, firing them to a temperature approximately 3200° F. where the mixture is a glassy mass, quenching the mass from this high temperature and grinding it to make a grog. I use kaolins and ball clays with low total fluxes so as to keep the mixture as refractory as possible, for example Tako kaolin and #5 Frazier ball clay. In firing the mass to so high a temperature that it is a glassy mass and substantially non-porous, the alumina in the clay will have reacted with silica to form mullite. The remaining silica together with the small amount of impurities in the clay and sand will be a glass. Rapid chilling holds the grog as a glassy mass and keeps the free silica from crystallizing out as cristobalite. For this purpose in preparing the grog the silica should be substantially all through a 100 mesh screen, but for the purpose of intimate mixing, finer silica, say 80% through a 325 mesh, or finer still, will make a more uniform glassy grog and may be accomplished at a lower temperature or in less time. If temperature and time are available for this operation, the silica may be coarser than 100 mesh. The temperature required depends upon the silica-alumina ratio, and may be obtained from liquidus curve from the silica-alumina phase diagram shown as FIG. 117, page 63, Phase Diagrams for Ceramists, published by American Ceramic Society. The liquidus curve was obtained from chemically pure constituents, namely, silica and alumina. Where a small amount of fluxes occur in the material the temperature may be somewhat lower than the liquidus curve illustrated in the diagram.

The curves of FIGS. 1, 2, 3 and 4 show that grogs having a large percentage of silica, when fired to a sufficiently high temperature for a sufficient length of time and quenched, there is no cristobalite formed, and a substantially straight line curve results. Usually grog that contains 60% $SiO_2$ must be fired longer or at a higher temperature than one containing a larger percentage of $SiO_2$.

It is necessary to chill or quench this mass rapidly to prevent the silica crystallizing out as cristobalite on cooling. This may be done by plunging it in water if the masses are large or by cooling it rapidly in air if the masses are small, or by any other method that will chill the mass rapidly. For example, I make a grog having a silica content of about 75¼% by mixing 55% Tako kaolin with 45% fine silica 86–90% through 325 mesh screen), fire this mixture to approximately 3200° F. until it has become a glassy mass and quench the mass by dropping it into water. Small pieces about ½" diameter may be chilled rapidly in air but masses of approximately 2½" diameter should be water cooled, to prevent formation of cristobalite in the center of the mass.

Where the fired grog materials are in the form of particles about ½" diameter or larger, they will be crushed to about .15" to fines before mixing them with the bonding clay.

I make grogs having a total silica content of 60% to 85% depending on the product in which the grog is to be used. In each case I want the grog substantially zero porosity and chilled after the high firing. The rapid chilling or quenching is especially necessary in the grogs with a high silica content. In a grog with silica as low as 60%, the amount of cristobalite formed is small so the tendency to break when reheated through the cristobalite inversion range is not so great. The more silica in the grog, the greater necessity to chill it rapidly to minimize the formation of any cristobalite in cooling.

The time and the temperature required to obtain a glassy mass and the rapidity of quenching may be determined by taking samples and making an expansion curve to know whether the silica has been dissolved, and only a glassy mass containing mullite and glass remains.

It is desirable to have a grog with as low a porosity as possible so as to make an ultimate product with a low porosity. Also a dense grog will not take up water which means lower water required for casting, hence lower drying shrinkage and faster drying. I have found that if I fire a high silica composition to so high a temperature that the mass is largely glass and mullite and quench this rapidly, a dense grog is formed that can then be heated up through the cristobalite inversion range without cracking.

These grogs are used in making various refractory products, among them tank blocks, glass melting pots, debiteuse, drawbars, floaters and other high silica products. The grog is ground, the particle size distribution controlled, and mixed with plastic clays to form these products.

The following are illustrative of various suitable compositions and mixtures which I have employed:

Mixture A

Matrix: By wt. percent
- Frazier #5 Tenn. ball clay _____ 10
- Georgia kaoline _____ 8
- Silica—100 mesh _____ 18
- Calcined kaolin—100 mesh _____ 14
- Fused (silica and kaolin)—100 mesh _____ 3.3

Total matrix _____ 53.3
(Silica in matrix 71%)

Grog:
- Fused (silica and kaolin)—10+100 mesh _____ 46.7

Total grog _____ 46.7
(Silica in grog 80.3%)

Mixture B

Matrix:
- Frazier #5 Tenn. ball clay _____ 6
- S.G.P. Tenn. #1 clay _____ 9
- Georgia kaolin _____ 5
- Fused (silica and kaolin)—100 mesh _____ 30

Total matrix _____ 50
(Silica in matrix 60.5%)

Grog:
- Fused (silica and kaolin)—10+100 mesh _____ 50

Total grog _____ 50
(Silica in grog 75.5%)

Mixture C

Matrix:
- Frazier #5 Tenn. ball clay _____ 6
- S.G.P. Tenn. #1 clay _____ 9
- Georgia kaolin _____ 5
- Silica—100 mesh _____ 15
- Calcined kaolin—100 mesh _____ 15

Total matrix _____ 50
(Silica in matrix 68.6%)

Grog:
- Fused (silica and kaolin)—10+100 mesh _____ 50

Total grog _____ 50
(Silica in grog 75.5%)

Mixture D

Matrix:
- Frazier #5 Tenn. ball clay _____ 8
- S.G.P. Tenn. #1 clay _____ 10
- Georgia kaolin _____ 7
- Calcined flint clay—100 mesh _____ 16

Total matrix _____ 41
(Silica in matrix 53%)

Grog:
- Fused (silica and kaolin)—20+100 mesh _____ 59

Total grog _____ 59
(Silica in grog 75.5%)

Mixture E

Matrix:
- Georgia kaolin _____ 22
- Mississippi ball clay _____ 8
- Fused (silica and kaolin)—100 mesh _____ 19

Total matrix _____ 49
(Silica in matrix 51.8%)

Grog:
- Fused (silica and kaolin)—8+100 mesh _____ 51

Total grog _____ 51
(Silica in grog 75.5%)

Mixture F

Matrix: By wt. percent
- Frazier #5 Tenn. ball clay _____ 8
- S.G.P. Tenn. #1 clay _____ 10
- Georgia kaolin _____ 7
- Calcined kyanite—100 mesh _____ 20

Total matrix _____ 45
  (Silica in matrix 46.4%)

Grog:
- Fused (silica and kaolin) −10+100 mesh _____ 55

Total grog _____ 55
  (Silica in grog 75.5%)

Mixture G

Matrix:
- Frazier #5 Tenn. ball clay _____ 6
- S.G.P. Tenn. #1 _____ 9
- Georgia kaolin _____ 5
- Silica—100 mesh _____ 5
- Fused (silica and kaolin)—100 mesh _____ 25

Total matrix _____ 50
  (Silica in matrix 65%)

Grog:
- Fused (silica and kaolin)—10+100 mesh _____ 50

Total grog _____ 50
  (Silica in grog 65%)

When bodies formed of these mixtures were fired to 800° C., their linear expansion ranged from slightly more than 0.175%, for mixture F, to slightly more than 0.275% for mixture A.

Some of these products are shipped unfired, in which case the product is heated up in the furnace, or before being placed in the furnace and then it is not allowed to cool down to the cristobalite inversion range during the furnace operation for the lifetime of the piece. During the operation of the furnace the glass in the grog gradually transforms to cristobalite. Cristobalite above its alpha-beta transformation temperature has a gradual expansion curve, so that a product high in cristobalite is not subject to large expansion or contraction stresses unless its temperature is lowered to around 200°–300° C.

Figure 5:
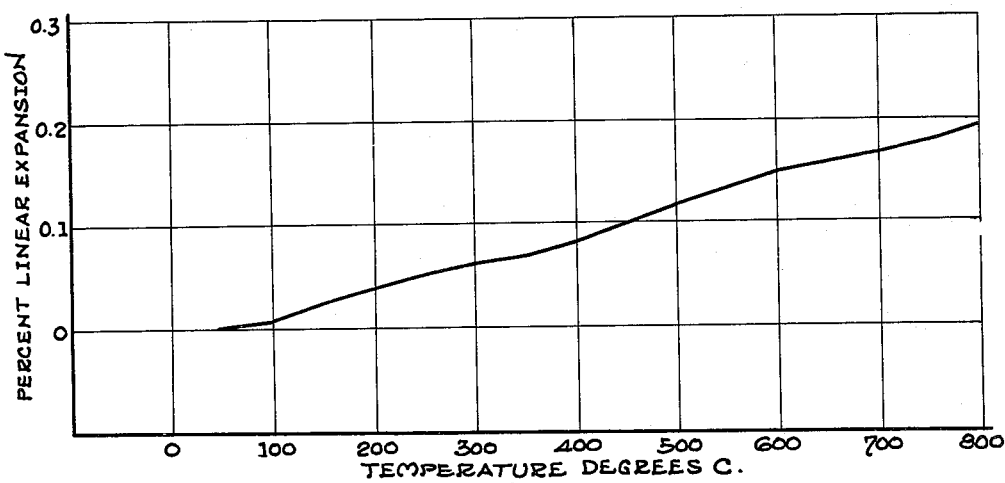
FIG. 5 is a curve showing the flux body with siliceous grog fired to 800° C.

The curve of FIG. 5 is shown as representative of a body with a substantially uniform expansion curve up to 800° C. This results from the use of a grog with approximately uniform expansion.

Figure 6:
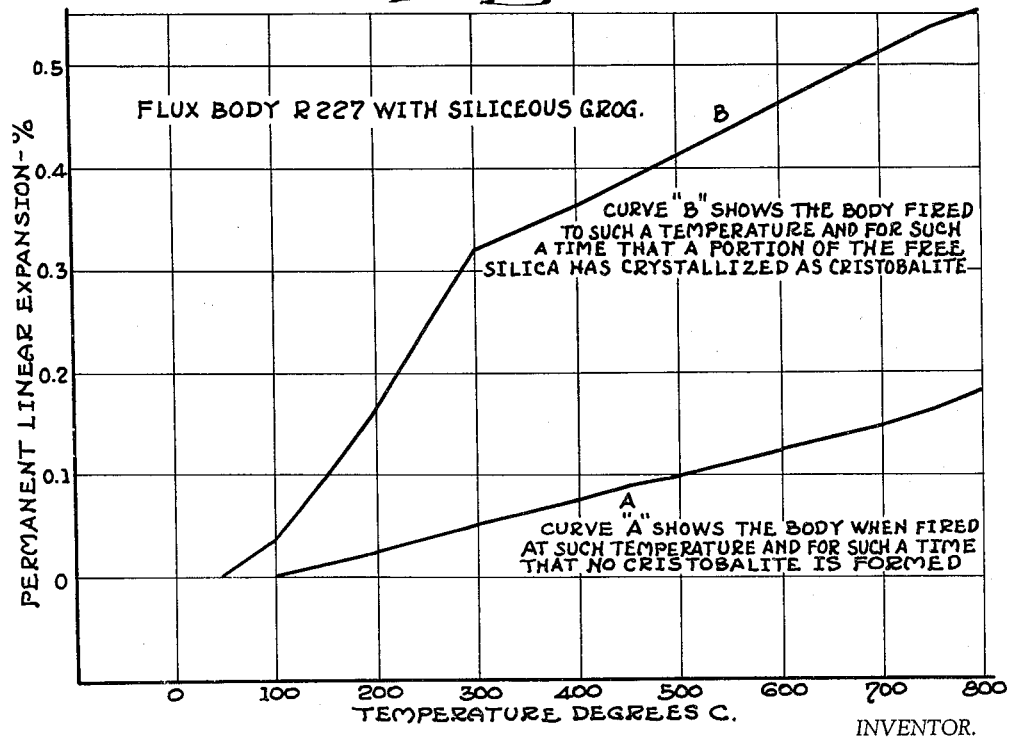
FIG. 6 shows two curves showing a flux body with siliceous grog fired to 800° C.

In FIG. 6, curve A shows the body when fired at such a temperature and such a time that no cristobalite has formed. Curve B shows the same body fired to such a temperature and for such a time that a portion of the free silica has crystalized as cristobalite with its characteristic rapid expansion at 200° to 300° C., which gives the desired result.

While the completed bodies can be shipped in an unfired condition, they can be previously fired to not higher than cone 8, to give them greater strength during shipment. The free silica would not crystalize at cone 8 for a short period.

Figure 7:
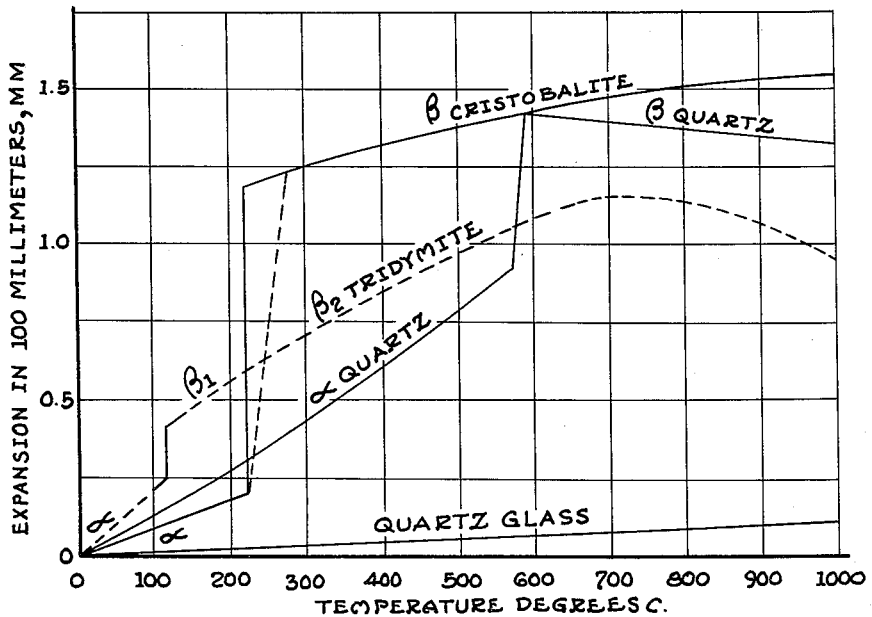
FIG. 7 is a curve showing the characteristic expansion of cristobalite.

For a curve showing cristobalite expansion characteristics, see "A Study of Silica Refractories" by J. Spotts McDowell, Transactions American Institute of Mining Engineers, 1917, page 2007, such a curve being shown in FIG. 7 of the drawing.

Grog prepared in the manner above described can be sold as a commercial product in itself, in which case the customer will mix it with bonding clay to form the shapes which he may desire.

I claim as my invention:

1. The steps in a method of forming refractories, which comprise making a mixture that contains not substantially less than 60% silica and the remainder consisting of an alumina-containing material that is of the group which consists of kaolin and ball clay, firing the mixture to a point at which the alumina-containing material has reacted with the silica, to form mullite and glass, cooling the fired mixture with sufficient rapidity to prevent the formation of cristobalite to a substantial extent, grinding the fired mixture to form grog of desired sizes, of from .15" to fines, and thereafter mixing the grog with a bonding clay to form a refractory body, preliminary to final firing, the grog constituting not substantially less than 50% of the body, and the bonding clay not substantially more than 50% of the body.

2. The steps in a method of forming refractories, which comprise making a mixture that contains 60% to 85% silica and the remainder consisting of an alumina-containing material that is of the group which consists of kaolin and ball clay, firing the mixture to a point at which the alumina-containing material has reacted with the silica, to form mullite and glass, cooling the fired mixture with sufficient rapidity to prevent the formation of cristobalite to a substantial extent, grinding the fired mixture to form grog of desired sizes of from .15" to fines, and thereafter mixing the grog with a bonding clay to form a refractory body, preliminary to final firing, the grog constituting not substantially less than 50% of the body, and the bonding clay not more than 50% of the body.

3. The steps in a method of forming refractories, which comprise making a mixture that contains not substantially less than 60% silica and the remainder consisting of an alumina-containing material that is of the group which consists of kaolin and ball clay, firing the mixture to a point at which the alumina-containing material has reacted with the silica, to form mullite and glass, cooling the fired mixture with sufficient rapidity to prevent the formation of cristobalite to a substantial extent, grinding the fired mixture to grog sizes of from .15% to fines, and thereafter mixing the grog with a bonding clay to form a refractory body preliminary to final firing, the grog constituting not substantially less than 50% of the body, and the remainder the bonding clay that contains from 46% to 71% silica.

References Cited in the file of this patent

UNITED STATES PATENTS

| | | |
|---|---|---|
| 1,882,701 | Alley | Oct. 18, 1932 |
| 2,272,618 | Fessler et al. | Feb. 10, 1942 |
| 2,362,825 | Hutchins | Nov. 14, 1944 |
| 2,641,044 | Bearer | June 9, 1953 |
| 2,695,849 | McMullen | Nov. 30, 1954 |